July 4, 1967  C. O. F. FYRK  3,329,436
MATERIAL SPREADER APPARATUS
Filed Jan. 3, 1965  2 Sheets-Sheet 1

Inventor
Clas O. F. Fyrk
By
McCanna, Morsbach & Pillote
Attorneys

July 4, 1967  C. O. F. FYRK  3,329,436
MATERIAL SPREADER APPARATUS
Filed Jan. 8, 1965  2 Sheets-Sheet 2
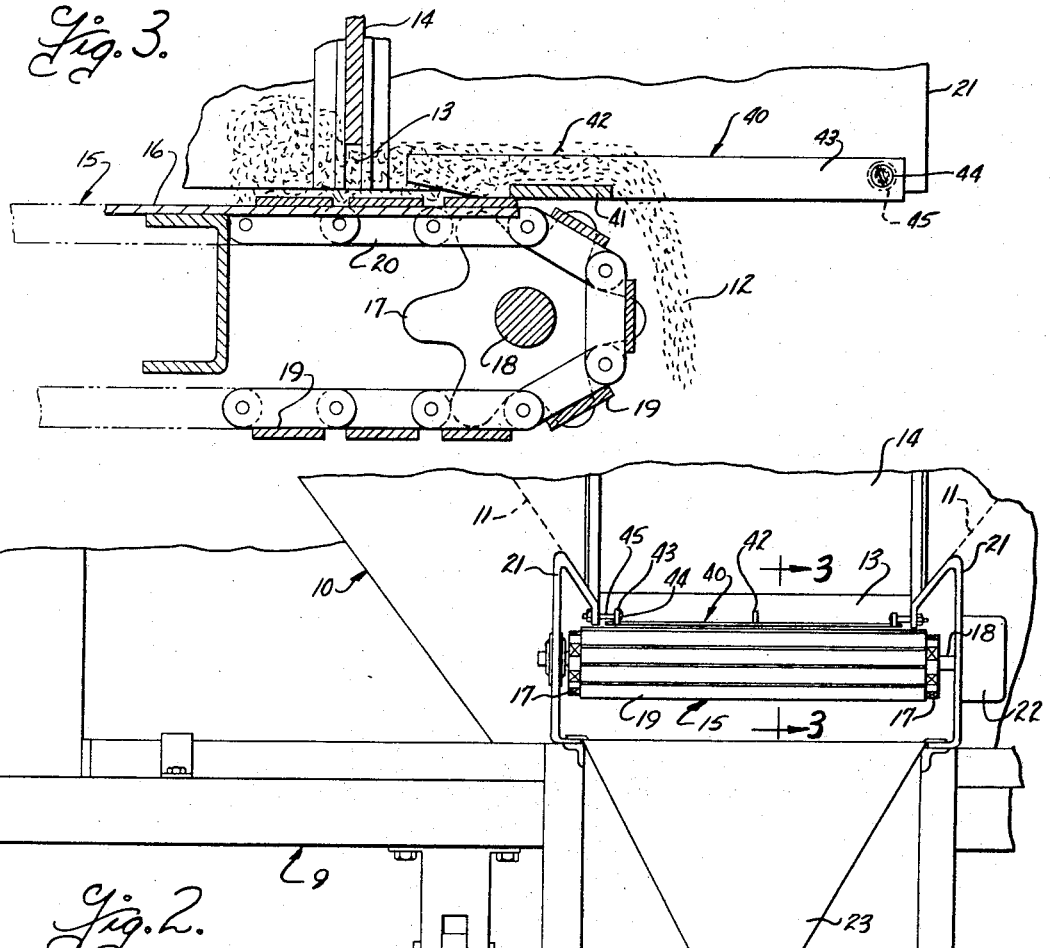
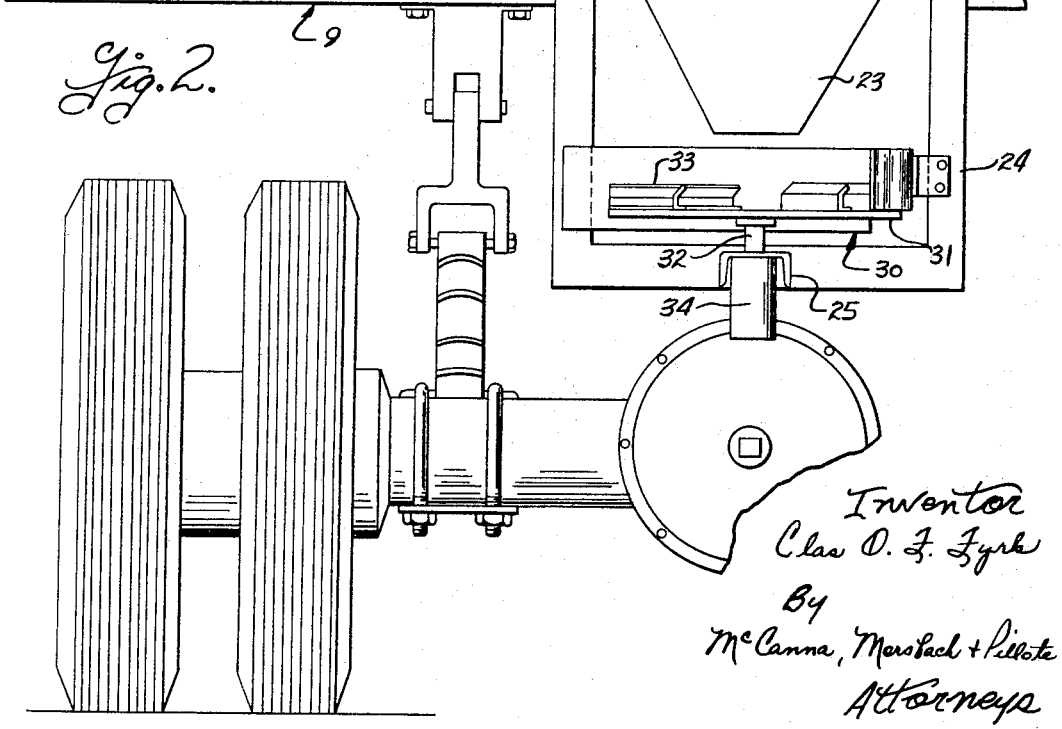
Inventor
Clas O. F. Fyrk
By
McCanna, Morsbach & Pillote
Attorneys

United States Patent Office 3,329,436
Patented July 4, 1967

3,329,436
MATERIAL SPREADER APPARATUS
Clas O. F. Fyrk, Rockford, Ill., assignor to Swenson Spreader & Mfg. Co., Lindenwood, Ill., a corporation of Illinois
Filed Jan. 8, 1965, Ser. No. 424,291
8 Claims. (Cl. 275—15)

ABSTRACT OF THE DISCLOSURE

A material flow board mounted for undulating movement over the spaced flights at the discharge end of an endless type conveyor. The flow board provides a generally uniform discharge of material to a spinner type spreader.

This invention relates in general to a material spreader apparatus and particularly to an apparatus for providing a generally uniform discharge from an endless type conveyor having moving flights.

In the spreading of particulate material such as salt, sand, fertilizer and the like, it is frequently desirable to spread the material as uniformly as possible. In a spreader apparatus for spreading such material, an endless type conveyor having spaced flights is frequently utilized. While this type conveyor has many advantages, it has the disadvantage of intermittently discharging material onto the spreader due to the tilting of the flights as they pass around the sprocket at the discharge end of the conveyor, and thus causing a certain amount of uneven spreading of the material.

Thus, an important object of this invention is to provide a spreader apparatus including an apparatus for substantially preventing intermittent discharge of material from an endless type conveyor having moving flights.

Another object of this invention is to provide a spreader apparatus including an endless type conveyor having moving flights and including a relatively uncomplicated attachment for providing a generally uniform discharge of material to the spreader.

A further object of this invention is to provide an apparatus for receiving material advanced by an endless type conveyor having moving flights and for discharging said material at a generally uniform rate at a point past the outermost portion of the conveyor.

Yet another object of this invention is to provide an apparatus in accordance with the foregoing object which is mounted to ride over the moving flights of an endless type conveyor to receive the material advanced by said conveyor.

These, together with other objects and advantages of this invention will be more readily appreciated as the invention becomes better understood by reference to the following detailed description when taken in connection with the accompanying drawings wherein:

FIG. 2 is a rear view of a spreader apparatus embodying this invention and mounted on a motorized vehicle;

FIG. 3 is a longitudinal sectional view taken along plane 3—3 of FIG. 2; and

Figure 1:
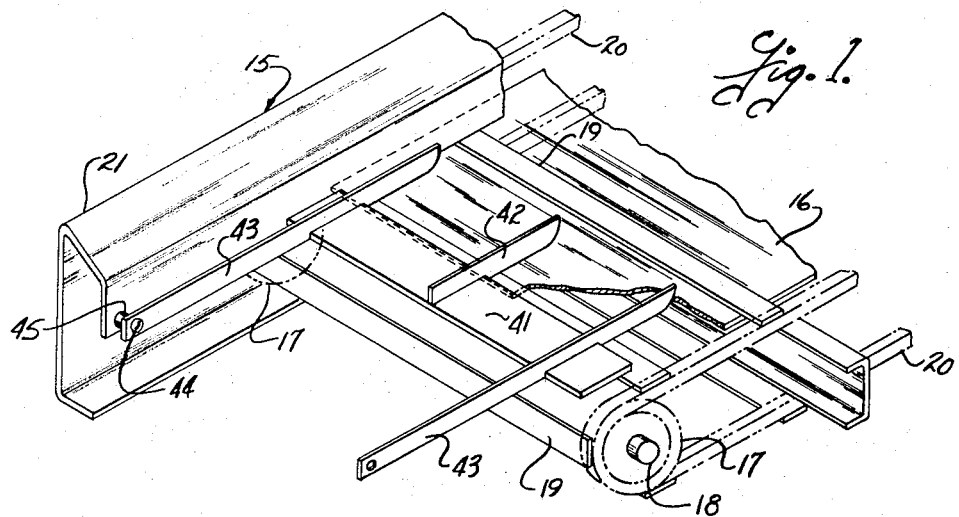
FIGURE 1 is a perspective view of a material flow apparatus for providing a generally uniform discharge from an endless type conveyor having spaced flights and mounted generally above the discharge sprocket of said conveyor and with the conveyor having a portion broken away to better illustrate the relationship of the parts.

Referring now more specifically to the drawings, the spreader apparatus includes a hopper 10, a spreader generally indicated by the numeral 30, and a material conveyor apparatus generally indicated by the numeral 15. The hopper or box 10 may be of any suitable type and, as illustrated herein, is of the V-box type which is adapted to receive particulate material such as salt, sand, fertilizer or the like. In general, the hopper 10 has sides 11 sloping toward the centrally located conveyor apparatus 15. This conveyor apparatus is conveniently located within the box or hopper 10 at the base of the V-shaped sides 11 thereof. The conveyor is of the endless type and includes a generally flat material support plate 16, and rear and front sprocket members 17, 17'. In the form shown, material is discharged over the rear sprocket member 17 hereinafter sometimes referred to as a "discharge sprocket." The discharge sprockets 17 are mounted on a shaft 18 located externally of the hopper 10 and conveniently describe a discharge end of a conveyor. The conveyor apparatus also includes flights 19 conveniently mounted on chains 20 which move around the sprocket members. The above described elements of the conveyor are conveniently disposed between upstanding side rails 21 which retain the particulate material on the conveyor; however, it is contemplated that other means may be employed to retain the material on the conveyor. The conveyor apparatus includes means for driving the flights 19 and, in the embodiment illustrated, it is conveniently in the form of a hydraulic motor 22 mounted on shaft 18. While it is contemplated that the conveyor may be actuated by means other than a hydraulic motor, the motor herein illustrated is a positive displacement type, for example, of the gear, vane, or gerotor type. The motor rotates shaft 18 and sprockets 17 which operate to move the chains 20 and the flights 19 attached thereto. The flights move along the material support plate 16 to convey the particulate material 12 out of the box or hopper 10. As best illustrated in FIG. 3, the material is conveyed through a discharge opening 13 adjacent one end of the box or hopper. The height of the discharge opening 13 may be controlled by adjusting a gate 14 mounted on the box 10 to regulate the amount of material being discharged. The gate 14 also serves as a strike-off plate for limiting the thickness of material conveyed to the terminus of the conveyor. Thus, it can be seen that the material on the discharge end of the conveyor has a generally uniform height for any given setting of the gate. While the conveyor apparatus 15 is herein shown arranged longitudinally of a motorized vehicle or truck 9, it is contemplated that the present invention is also adapted for use in different arrangements with different types of boxes or hoppers. The conveyor apparatus 15 generally dumps the particulate material 12 into a chute 23 or other means for directing the material onto the spreader 30. In the embodiment illustrated herein, the chute 23 is in the form of a funnel receptacle disposed beneath the conveyor apparatus 15. It is contemplated that other means may be utilized for directing the flow of material to the spreader or, in some arrangements, may be eliminated altogether.

The spreader, generally designated by the numeral 30 is herein illustrated as a spinner or broadcast type spreader as best shown in FIG. 2. Such broadcast spreaders are well known and in general include a disk or plate 31 mounted for rotation about a generally upright axis 32. There are a plurality of vanes 33 mounted on the disk 31 for engaging and throwing the material outwardly as the disk is rotated. The spreader is conveniently mounted on an outwardly extending arm 25 attached to a frame 24. In the embodiment illustrated, the spreader is conveniently driven by a hydraulic motor 34 which may be similar to motor 22 described supra. While the spreader has been illustrated as a broadcast type mounted centrally at the rear end of a motorized vehicle 9, it should be understood that other type spreaders may be utilized and that they could be mounted at different locations on such a vehicle or otherwise mounted.

In an ordinary adaptation of an endless type conveyor having moving flights such as flights 19, the flights are tilted from a generally horizontal to a generally vertical position as they move around the discharge sprockets 17 as best illustrated in FIG. 3. In ordinary use, as the space flights are tilted, the mass of material carried by each flight slides off in a discrete charge as soon as the flight is tilted beyond the angle of repose of the material thereon, thus causing an irregular or intermittent discharge of the material from the conveyor apparatus. When the material is intermittently discharged on a spreader, it is impossible for it to be spread in a generally uniform manner.

Figure 4:
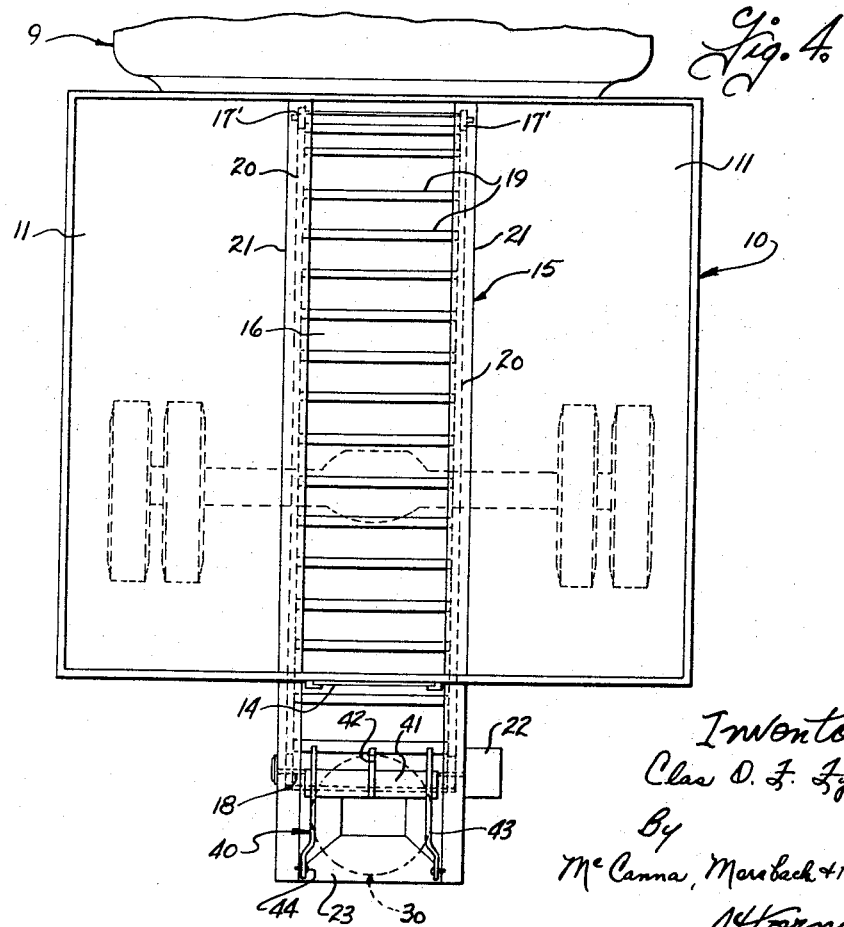
FIG. 4 is a top view of a spreader apparatus including the embodiment of this invention and mounted on a motorized vehicle, and showing an alternate means for mounting the material flow apparatus.

In accordance with the present invention, a material flow apparatus designated generally by the numeral 40 is provided for substantially preventing intermittent discharge of material from an endless type conveyor having moving flights. The material flow apparatus 40 includes a flow board 41 which lies crosswise of the conveyor apparatus 15, as best illustrated in FIGS. 1 and 4. The flow board has a length approximating the distance between the side rails 21 and a thickness sufficient to provide it rigidity. As best illustrated in FIG. 3, the flow board preferably has a width approximating the effective radius of the sprocket member 17. The inlet end of the flow preferably overlies the uppermost part of the discharge sprocket 17 or the axis of the shaft 18 and extends to a point generally overlying the outermost end of the discharge sprockets. The flow board lies closely adjacent to the upper run of the moving flights 19 and operates to receive material advanced by the flights and carry it generally past the discharge end of the conveyor thus eliminating any irregular or intermittent discharge of material from the conveyor. The flow board is supported for limited vertical movement and has a means for guiding the same over irregularities in the moving flights 19. As herein illustrated, the flow board guide means is conveniently in the form of runners 42 extending from the flow board toward the inlet of the conveyor. As best shown in FIG. 3, the bottom edge of the runners 42 is approximately at the same level as the bottom edge of the flow board 41 and the outermost portion of each runner is inclined upwardly. The upwardly inclined portion of the runners serves to guide said flow board over irregularities in the moving flights 19 whether they are spaced flights, as illustrated in FIGS. 1 and 4, or generally close together, as best shown in FIG. 3. When the moving flights are spaced, as indicated in FIGS. 1 and 4, the length of the runners 42 preferably approximates the distance between the flights so that the runners generally span the flights. This provides for a minimum amount of movement of the flow board 41 and it will undulate, as described infra, only for irregularities in the flights. In the embodiment shown, there are three of these runners; however, it is contemplated that different numbers may be used. The flow board 41 is conveniently mounted for the limited vertical movement by a pair of arms 43 attached to the topside thereof. These arms are conveniently in the form of extensions of two of the runners 42, and extend in a longitudinal direction to a point outwardly of the normal flow of material from the flow board 41. The arms 43 are preferably spaced from each respective side rail 21 by means of spacers 45 and pivotally mounted on the side rails by means of bolts 44. It should be understood that other means of mounting may be utilized, and, as shown in FIG. 4, the arms may extend outwardly of the normal flow material and then curve toward each respective side rail 21 for pivotal mounting thereon by bolts 44. In this manner no spacers are required. The mounting herein illustrated allows an undulatory movement of the flow board to compensate for any irregularities in the moving flights 19.

From the foregoing, it is deemed apparent that the material flow apparatus 40 will receive material advanced by the conveyor apparatus prior to the tilting of the flights around the discharge sprocket. The material is pushed across the upper side of the flow board by the continuing advancing of material by the conveyor so that the material discharges from the outer end of the flow board in a uniform stream. When a generally uniform flow of material is discharged on a spreader, the spreader can more readily spread the material in a uniform manner.

The foregoing is considered as illustrative of only the principles of the invention and while I have thus described and illustrated a specific embodiment of my invention, this has been done by way of illustration and not limitation. Further, since numerous modifications and changes will be readily apparent to those skilled in the art, it is not desired to limit the invention to the exact construction shown and described and I do not wish to be limited except as required by the scope of the appended claims.

I claim:
1. In combination,
 (a) storage means for storing particulate materials,
 (b) endless type conveyor means for conveying material from said storage means and having
  (1) a discharge sprocket disposed outside said storage means,
  (2) a plurality of spaced flights mounted for movement over said discharge sprocket in the manner of an endless type conveyor to advance said material toward said discharge sprocket, and
  (3) means for retaining said material on said conveyor means until advanced to said discharge sprocket,
 (c) means for operating said flights for movement at a generally uniform rate,
 (d) strike-off means for maintaining the thickness of material conveyed to a generally uniform preselected height above the conveyor flights,
 (e) spreader means disposed under said discharge sprocket of said conveyor means to spread said material,
 (f) means for operating said spreader means for spreading, and
 (g) a material flow apparatus, comprising,
  (1) a generally rigid flow board disposed crosswise of said conveyor apparatus and extending from a point overlying the outer terminus of said discharge sprocket of said conveyor means to a point adjacent to the uppermost point of said discharge sprocket whereby said material above the conveyor flights flows over said flow board in a generally uniform manner when impelled by said conveyor means,
  (2) means for mounting said flow board for undulatory movement in a direction generally perpendicular to said conveyor means to ride over said moving flights, and
  (3) means for guiding said flow board over said moving flights.

2. In a spreader apparatus of the class having a hopper for storing particulate material; a material conveyor apparatus disposed beneath said hopper and having at least one terminus extending from said hopper and comprising, a generally flat material support plate, sprocket members mounted on at least two shafts spaced laterally from each other at termini of said conveyor apparatus, a flexible conveyor having spaced flights shaped for movement along said support plate and around said sprockets in the manner of an endless type conveyor to carry said material to said one terminus of said conveyor, and a pair of upstanding side rails disposed on either side of said flexible conveyor to retain said material on said flexible conveyor; means for operating said flexible conveyor for movement at a generally uniform rate; a strike-off plate disposed above said conveyor apparatus for limiting the thickness of material conveyed to said terminus whereby the material conveyed has a generally uniform height; spreader means disposed under said one terminus of said conveyor to spread said material; and means for actuating said spreader means for spreading; the combination with said spreader apparatus of means for providing a generally uniform discharge of material onto said spreader means, said means comprising a generally rigid flow board having a length approximating the distance between said side rails, a width approximating the radius of the sprocket members generally adjacent thereto, and disposed crosswise of said conveyor in a plane substantially parallel to said material support plate and with one edge adjacent to the point where said flexible conveyor is generally tangential to said sprockets and the opposite edge overlying the said one terminus of said conveyor, whereby said material substantially flows over said flow board in a generally uniform manner when impelled by said conveyor apparatus; first and second arms each attached to the top side of said flow board at a point spaced from each respective side rail and extending in a longitudinal direction past the outermost portion of said flow board; means for pivotally mounting each said arm to said respective side rail for movement of said flow board and arms; and a plurality of runners, at least two of which are extensions of said arms, attached to said flow board with the lower side of each approximately level with the lower side of said flow board and extending substantially longitudinal to said flexible conveyor in a direction opposite to the flow of said material and shaped with the end portion of said lower side generally inclined upwardly a distance at least equal to the thickness of said conveyor flights whereby said runners guide said flow board over said moving flights by pivoting about said pivotal means.

3. In combination,
(a) storage means for storing particulate material,
(b) endless type conveyor means for conveying material from said storage means and having
  (1) a discharge sprocket disposed outside said storage means,
  (2) a plurality of generally rigid flights mounted for movement over said discharge sprocket at a generally uniform rate in the manner of an endless type conveyor to convey said material to said discharge sprocket, and
  (3) means for retaining said material on said conveyor means until conveyed to said discharge sprocket,
(c) strike-off means for maintaining the thickness of material conveyed to a generally uniform preselected height,
(d) spreader means disposed under said discharge sprocket of said conveyor means to spread said material, and
(e) a generally rigid flow board extending crosswise of said conveyor apparatus at a point adjacent the uppermost point of said discharge sprocket and shaped for receiving material advanced by said flights and for guiding the flow of the material generally past the outermost portion of said discharge sprocket whereby the material is deposited on said spreader at a generally uniform rate, and including means for mounting and guiding said flow board for undulating movement to ride over irregularities in the moving flights.

4. In combination,
(a) storage means for storing particulate materials,
(b) endless type conveyor means for conveying material from said storage means and having
  (1) a discharge sprocket disposed outside said storage means,
  (2) a plurality of spaced flights mounted for movement over said discharge sprocket in the manner of an endless type conveyor to advance said material toward said discharge sprocket, and
  (3) means for retaining said material on said conveyor means until advanced to said discharge sprocket,
(c) means for operating said flights for movement at a generally uniform rate,
(d) strike-off means for maintaining the thickness of material conveyed to a generally uniform preselected height above the conveyor flights,
(e) spreader means disposed under said discharge sprocket of said conveyor means to spread said material,
(f) means for operating said spreader means for spreading, and
(g) a material flow apparatus comprising,
  (1) a generally rigid flow board extending crosswise of said conveyor means and having a width approximating the radius of said discharge sprocket and shaped for receiving the material carried by said flights at a point substantially adjacent the uppermost point of said discharge sprocket and for guiding the flow of the material generally past the outermost portion of said discharge sprocket whereby the material is deposited on the spreader at a substantially uniform rate,
  (2) at least one arm attached to said flow board and extending outwardly past the discharge sprocket,
  (3) means for pivotally mounting said arm whereby said flow board may undulate to ride over said moving flights, and
  (4) at least one runner attached to said flow board and extending generally longitudinally to said conveyor in a direction opposite the direction of movement of the upper run of said conveyor to guide said flow board over said moving flights.

5. In a spreader apparatus of the class having a hopper, a discharge sprocket located external of said hopper, and an endless type conveyor having spaced flights for conveying particulate material from the hopper and over the discharge sprocket to a spreader, the improvement comprising means for carrying the flow of said material in a generally uniform manner and substantially eliminating intermittent discharge of the material by said spaced flights, said means including a generally rigid flow board disposed substantially crosswise of said conveyor and having an inlet end disposed at a point adjacent the uppermost point of said discharge sprocket and extending to a point generally overlying the outermost point of said discharge sprocket, and said means including means for mounting and guiding said flow board for undulating movement whereby the flow board rides over the advanced flights and closely adjacent thereto for receiving material advanced by the conveyor and for carrying the flow of said material in a generally uniform manner and discharging same on the spreader.

6. In a spreader apparatus, the combination of a spreader, a hopper for storing particulate material, a discharge sprocket disposed external of said hopper, an endless type conveyor having spaced flights for movement over said discharge sprocket and for conveying said material from said hopper and over the discharge sprocket to said spreader, a generally rigid flow board disposed crosswise of said conveyor and having an inlet end disposed adjacent the upper run of said spaced flights and extending at least from a point adjacent the uppermost point of said discharge sprocket to a point generally overlying the outermost point of the discharge sprocket whereby material advanced by the conveyor is pushed across the upper surface of the flow board for discharge therefrom in a generally uniform stream, means supporting said flow board for limited vertical movement, and means for guiding said flow board over said flights of the conveyor as they pass around the discharge sprockets whereby the flow board rides over the upper surface of the flights in closely spaced adjacency thereto.

7. In a spreader apparatus of the class mounted on a vehicle and having a hopper for storing particulate material and an endless type material conveyor apparatus mounted generally horizontally and disposed beneath said hopper and including a discharge sprocket located external of the hopper and spaced flights for advancing said material from the hopper and over the discharge sprocket to a spreader, the improvement comprising: a flow board extending generally crosswise of said conveyor and having an inlet end disposed at a level adjacent the uppermost portion of said spaced flights and extending at least from a point adjacent the top of said discharge sprocket to a point generally overlying the outermost point of said discharge sprocket for receiving material from the conveyor and for carrying the flow of said material in a generally uniform manner and discharging the same on the spreader, and means for mounting said flow board for limited movement in a direction generally perpendicular to said conveyor means and at least one runner attached to said flow board for guiding the flow board over the moving flights.

8. The combination of claim 5 wherein said flow board has a generally planar upper surface and is mounted with said surface extending generally horizontally.

References Cited
UNITED STATES PATENTS 3,097,851 7/1963 Cohrs et al. _____ 275—6 X
3,188,094 6/1965 Johnston _____ 275—6

FOREIGN PATENTS 682,864 6/1930 France.
891,677 3/1962 Great Britain.

ABRAHAM G. STONE, *Primary Examiner.*

J. R. OAKS, *Assistant Examiner.*